Oct. 19, 1971           R. S. HILL ET AL           3,613,114
HELMET SUPPORTING AND POSITIONING ASSEMBLIES
Filed Aug. 20, 1969                               4 Sheets-Sheet 1

United States Patent Office 3,613,114
Patented Oct. 19, 1971

---

3,613,114
HELMET SUPPORTING AND POSITIONING ASSEMBLIES
Rodney S. Hill, Kenard E. Urion, and Frederick W. Feldmann, Dover, Del., assignors to ILC Industries, Inc., Dover, Del.
Filed Aug. 20, 1969, Ser. No. 851,650
Int. Cl. A42b *3/00*
U.S. Cl. 2—3
20 Claims

ABSTRACT OF THE DISCLOSURE

Support and positioning devices for use in combination with conventional or other components of a protective helmet that is generally classified in Class 2. These novel devices can be quickly assembled into a protective helmet shell and are capable of rigidly and/or adjustably securing and supporting an energy-absorbing member and/or headband mechanism and/or a variety of head suspensions in desired positions within the cavity of the helmet.

BACKGROUND OF THE INVENTION

This invention relates to support and positioning members and assemblies for use in combination with one or more components of a protective helmet. The novel support and positioning members of this invention are capable of simultaneously (1) firmly securing and supporting an energy-absorbing, inner liner in a desired position within the cavity of the helmet; (2) adjustably securing and supporting a conventional or other headband mechanism assembled thereto in a desired vertical position within the cavity of the helmet; and (3) securing and suspending a conventional or other flexible, head-suspension assembled thereto in a desired position within the cavity of the helmet.

Prior to this invention, several types of head-protecting structures had been developed and proposed for use in various hazardous environments. In recent years, however, much engineering effort has been directed toward the development of improved and effective protective helmets for users and occupants of land vehicles, particularly for use by motorcyclists or persons associated with vehicles that do not provide outer-shell protection against collision and impact.

Most of the more recently developed protective helmets for users and occupants of land vehicles include a rigid, outer-shell for protection against concentrated blows and impacts, a resilient, energy-absorbing, inner-liner, and a headband that engages at least a portion of the user's head in a generally horizontal direction. In some of these recently developed helmets the head of the user directly abuts either the energy absorbing, inner-liner or a lining of soft material, while others provide a flexible, head-supporting mechanism for suspending the head within the cavity of the helmet.

Each of the prior known protective helmet developments utilizes some structure or mechanism for supporting within the cavity of the helmet the inner components, such as a headband and/or a head-suspension or sling which engages over the head. Most of these supporting mechanisms are relatively complex and cumbersome from a fabrication viewpoint and frequently include several independent elements to support inner components within the helmet in the desired position.

BRIEF DESCRIPTION OF THE INVENTION

This invention contemplates novel support and positioning members and assemblies providing simplified novel unitary means for expeditiously fabricating into a basic helmet structure for support of an energy-absorbing liner, a headband, head suspension, or combinations of them so they are quickly and properly positioned and retained in the helmet fitted to the head so as to support the associated helmet in place thereon for safety and comfort to the wearer. The support and positioning member for such assemblies is adapted directly to support an impact or energy-absorbing, inner liner within the helmet shell and can be used to firmly secure the liner in place within the shell or to its inner surface. The support and positioning member can also include means for adjustably securing a headband assembled thereto in a desired vertical position within the cavity of the helmet. When a head-suspension or sling is to be used over the top area of the head, the support and positioning member also provides means for securing and suspending such head-suspension, to be assembled therewith, within the cavity of the helmet so as to support the helmet and distribute loading forces over a large surface area of the head and provide a covering over the inner surface of the impact or energy absorbing layer spaced therefrom. This invention, therefore, may be used in helmets that do not use head suspension or sling structures as well as in helmets that do use such structures.

In accordance with a preferred embodiment of this invention, a flexible, generally U-shaped member, which advantageously can be an annulate ring of channel-like cross section, is positioned in the helmet so that the peripheral, lower edge area of the energy absorbing, inner liner neatly fits into the channel defined by inner, outer and bottom walls of the U-shaped member. Advantageously, the U-shaped member is constructed in the form of a closed, preferably continuous ring having the channel produced by the cross sectional configuration thereof facing upward and a substantially flat downward directed lower face adapted to be supported and retained in the helmet shell by shelf-like inner-directed portions of a resilient edging attaching about the lower edge of the helmet shell. Other or additional shelf-like means advantageously can be attached to the inner portion of the helmet for support and proper positioning of the U-shaped members, for example by padding, terminated in an upper edge adhered about the inner wall of the shell for such purposes.

Such U-shaped member may be secured either rigidly to or frictionally held against the inner surface of the outer shell. When securement is rigidly made, adhesive, rivets or any other type securing or attaching means may be used and when securement is frictional the flexibility of the member and its abutment on the edging and/or stop or support means keeps the member in its desired position within the helmet cavity.

Extending upwardly from the inner wall of the U-shaped member, and being preferably an integral part thereof, is a group of spaced ear members, each having at least one opening preferably centrally located therein. These ear members are used when it is desired to secure in position within the cavity of the helmet, preferably by fastener means such as studs or the like, a conventional or other headband member which engages generally horizontally around the head. When the attaching means are studs they are provided on the headband member projecting outwardly and separably or permanently attached thereto spaced around the headband with each stud positioned to extend through the central opening of a respective ear member on the U-shaped member. Such studs provide for frictionally securing the headband to the U-shaped member within the helmet cavity. Other forms of fastener means for securing the headband member to the U-shaped member are contemplated, i.e., rivets, nuts and bolts, clips, cotter-pin type, flexible cords or other fastening means.

To provide vertical adjustability of the headband with respect to the helmet shell, additional openings generally vertically above and/or below the central opening may be included. Thus, the headband may be selectively positioned higher or lower in the helmet cavity by respectively utilizing the vertically higher or lower openings above mentioned.

When the support and positioning member of this invention is contemplated for use in a helmet having a head-suspension or sling, a group of spaced, tongue members are provided, such extending upwardly from the inner wall of the U-shaped member and also being preferably an integral part thereof. The tongue members each include one or more openings that are each preferably a horizontally extending slot near the upper end of the respective tongue members and positioned in the U-shaped member for uniform distribution of loading purposes.

Advantageously, there is assembled with the preferred embodiment of this invention a head suspension or sling that covers substantially the entire upper surface of the crown of the head. The head suspension is formed from a material contourable as a thin flexible sheet over a wide, substantially complete crown surface of the head and provided at oppositely arranged spaced locations about its peripheral edge with flexible support or gripping taps for securing the suspension to the support and positioning member or means. The gripping tabs can be interfitted through the respective pairs of slots in the tongue members so that when the head suspension is engaged over the top of the head, the support and positioning member is supportable therefrom which in turn can support the helmet on the head. The tabs can be tightly but adjustably fitted in a respective pair of the slots and laced reversely upon themselves to provide adjustable holding of the suspension to the support and positioning member. This arrangement thereby at once provides quick and easy height adjustability of the head suspension with respect to the support and positioning member at independent locations around the periphery of the head and a safety factor provided by an increase of frictional gripping of the tabs in the slots under sudden high loadings as for example when a blow is received on the helmet shell.

In a modified embodiment of the invention a well known flexible-webbing type head-suspension mechanism can be secured to the tongue members by slidably securing the webbing members into the slots of the tongue members and thus securing and positioning the head-suspension mechanism within the helmet cavity. It is contemplated, however, that other well known types of head-suspension mechanisms may be used and that they may be secured to the tongue members by other well known fastener means, i.e., friction studs, rivets, nuts and bolts, cotter-pin type fasteners, stitching, staples, flexible cords or other securing means.

These and other objects and advantages will become more apparent from the following description of preferred embodiments of the inventive concepts presented herein having reference to the appended drawings.

Figure 1:
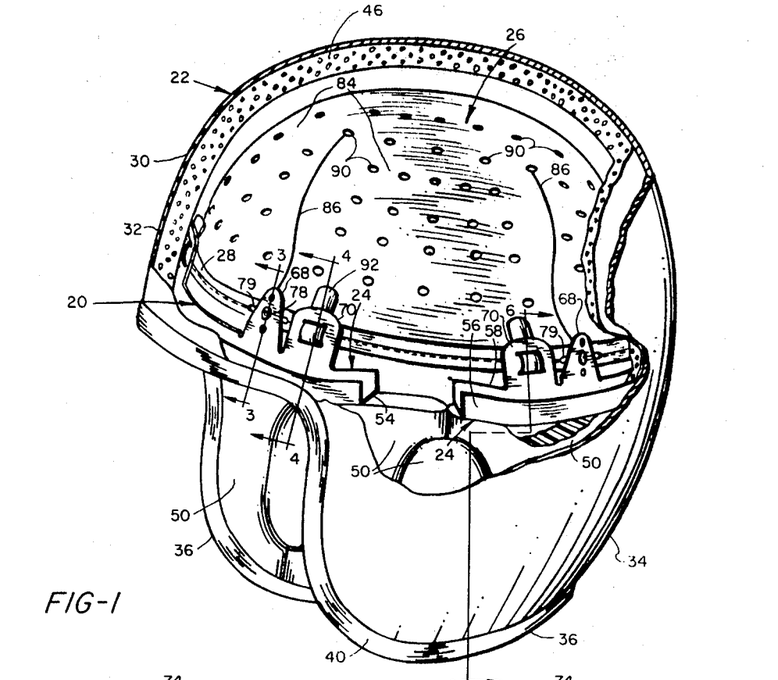
FIG. 1 is a perspective view of a full head protective or long type helmet showing installed therein a preferred embodiment of the support and positioning device of this invention, together with a headband and a head suspension which are assembled thereto, portions of the helmet being cut away to show structural details and relationships of the components within the helmet.

Referring to the drawings briefly described above, a preferred inventive helmet supporting assembly is indicated generally by numeral 20 installed in a basic helmet 22 of the full head protective or "long" type which extends down over the ears and portions of the sides of the face and lower rear of the wearer's head. The helmet supporting assembly 20 includes a preferred support and positioning member of this invention, generally indicated by the numeral 24 is assembly with a preferred head suspension or sling 26 of this invention and a headband 28.

The helmet 22 has a protective, hard outer shell 30 including an upper portion that forms a head-surrounding helmet crown 32 and a helmet shell lower portion 34 that covers the wearer's ears and the lower rear part of the head. A resilient protective edging 36 is adhered to the shell to fit around and cover the lower peripheral edge of the helmet for which purpose a groove 38 is provided molded into the edging. The edging or edging member 36 includes an outer piece 40 which covers over the outer surface of the lower edge of the helmet and an inner directed hollow cushion type molded beading 42 part of which fits against the inner wall of the shell. The beading has a free upper surface 44 that provides a substantially flat shelf extending inwardly around the peripheral edge of the helmet, portions of the shelf so formed being available for support of the support and positioning member or channel ring 24, and for positioning it in the helmet.

An impact or energy-absorbing inner liner 46 of inverted, one piece bowl-like shape is fitted up against the inner surface of the cavity forming the helmet crown and has a continuous, liner lower edge 48, that forms a downward directed lower edge surface which is approximately flat across the thickness of it. The liner is large enough to fully cover the upper part of the head, extending down over the upper forehead, around upper sides of the head above the ears and around the lower rear of the head. A fabric covered safety padding 50 is provided within the helmet lower portion extending rearward from the side edges of the face with the padding having a substantially flat upward directed padding edge which can act as an inner directed shelf extending around sides and back of the interior of the helmet to where the edging 36 turns downward at the sides and is available to position and/or support the support and positioning member.

The support and positioning member 24 or U-shaped member is a closed annulated channel ring of generally U-shape cross section and shown in its preferred form in FIGS. 1-4 and 7. It has a closed, ring-like and, in broad aspect, generally horizontally flat bottom wall 54. A ring-like outer wall 56 of uniform height is integrally connected to the bottom wall extending generally vertically up therefrom. Also extending up from the bottom wall integrally connected thereto around its inner edge is a ring-like inner wall 58. Outer, and inner walls are about uniformly spaced apart on the bottom wall defining therewith a generally flat bottomed annular channel or trough opening upward for neatly fitting over the lower edge of the inner liner 46.

Figure 2:
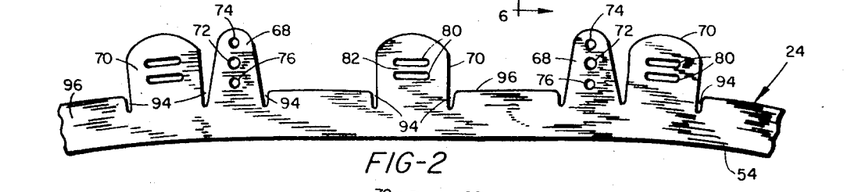
FIG. 2 is a plan view of the front half of the support and positioning member of FIG. 1, opened out, and also representing its rear half since these halves are functionally substantially identical.

Support and positioning or U-shaped member 24 is formed as a unitary flexible molding of plastic material, polyethylene being suitable, sized so its outer wall can fit snugly against the lower inner surface of the helmet shell. Also, support and positioning member 24 is contoured out of a flat plane to form at its left and right sides upward arches 60 curving over the ears of the wearer and has a front segment of arc 62 angled upwardly, slanting from the forward edges of the arches towards the front of the helmet and a smaller rear segment of arc 64 that angles upwardly, slanting from the rear edges of the arches towards the rear of the helmet. This configuration provides for the outer and inner walls 56 and 58 at front and rear to be angled progressively inwardly from sides of the segments of arc 62 and 64 reaching a maximum at front and rear center points of the support and positioning member so that it neatly fits to the angles made by the curvature of the helmet shell and the inner liner.

At respective right and left sides of the U-shaped support and positioning member integrally formed in the inner wall 58 thereof are two oppositely arranged pairs of upstanding ear members 68 and tongue members 70 with an additional tongue member positioned on the inner wall centrally at its front and rear.

The tongues form means for positioning and supporting in the helmet the suspension 26 and are arranged so as to be approximately evenly spaced about the head. It will be seen that the pairs of closely adjacent ear and tongue members 68, 70 are formed both with respect to each other on a side and facing directly between left and right sides respectively at front and rear, in mirror opposite arrangement. Thus there are two leftside ears 68 bracketing the two tongues of a respective left or right side, one of these ears respectively towards the front and one towards the rear at each side of the support and positioning members.

The ear members 68 are approximately evenly spaced about the head and together provide means for supporting and properly positioning the headband 28. Each ear member has defined through it a central opening 72 about centrally of the height of the ear member and above and below the central opening are an upper opening 74 and lower opening 76. These openings are sized to frictionally receive and retain the shank of a double-headed stud 78, which slides in elongate apertures or openings 79 that are defined in the stiff outer flange of the headband 28 for horizontal or circumferential headband adjustment. This construction provides for the headband, which engages around the head, to be affixed in adjustable assembly to the support and positioning member. The headband thus can be adjusted up or down at each location of its attachment to the ear members, by studs 78, independently of the other ear members, which provides for relative front to rear and/or side to side selective height adjustment.

The tongue members 70 each has a pair of generally horizontal slots or openings 80 defined therethrough separated by a gripping narrow support bar 82 to provide spaced frictional gripping slots or retaining means for attachment therewith of the head suspension or sling 26. It will be seen also that the tongue members are set in the support and positioning member so when in place on the head the upper and lower slots forming each pair are in corresponding location to attaching or gripping means of the head suspension. Also, slots 80 are directed substantially normal to respective vertical planes extending through the center of them and an imaginary center of loading at the top center of the crown of the head. Thus, the pairs of slots 80 on the left side, for example, can be seen to be angled inwardly and downwardly with respect to each other. The slots in the front and rear tongues are arranged horizontally.

The above described arrangements as to the ears, the tongues, and the spacing of them on the support and portioning member, of which they form a part, provide for even distribution of helmet loadings and convenience in adjustment of support of the helmet as well as for the proper placement and support therein of the headband and head suspension.

Figure 8:
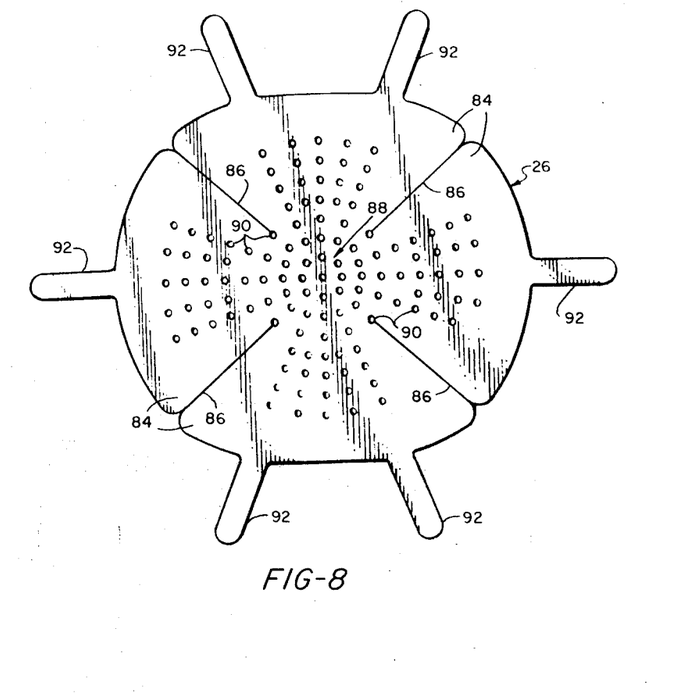
FIG. 8 is a plan view of the head suspension or sling shown in FIGS. 1 and 7.

The head suspension or sling 26 is a flexible panel cut from a sheet laminate of soft leather-like material backed by knit fabric and is preferably a fabric backed "Naugahyde" type plastic which may range from about one-half to about 3 but preferably about 1½ millimeters in thickness. The main body of the panel forming this suspension has a broad elipse-like outer periphery and is divided into four petal-like and abutting sectors 84 by cutting through the material of the suspension to form slits 86 and rounding the corners so formed. The slits extend radially inward from the outer periphery about two-thirds the distance of a radius to the center point of the suspension so that each slit terminates short thereof leaving an unslitted central area 88. Each of the sectors at sides of the suspension is wider and less deep than the sectors at front and rear ends of the suspension. Otherwise stated, the side sectors subtend a chord which is relatively longer and has a radial dimension through its center which is relatively shorter than the front and rear end sectors thus to provide a neat fit to the head and covering of the inner surface of inner liner 46. The suspension is further provided with a pattern of large openings as perforations 90 defined through the material of the suspension for ventilation and other purposes. The perforations are arranged in a pattern substantially symmetrical about the center of the suspension providing concentric circles of perforations with lines of them extending radially out from the center to near the peripheral edge of the suspension which increases the ability of the suspension to absorb and dissipate blows received on a helmet by increase of stretch along the lines of perforations and by tearing between adjacent perforations.

A series of gripping tabs or fastener members 92 are positioned in the outer peripheral edge of the main body of the suspension 26 spaced thereabout and extending radially away from the center of the suspension. The tabs are of uniform width and the same length, reaching out beyond the peripheral edge of the main body of the suspension a length of about two-thirds to about one-half the distance between the peripheral edge and the center of the suspension. One tab is centered at the front and rear sectors 84 with two tabs in each sector at left and right sides of the suspension for optimum holding of the sectors 84 above the head. Thus, tabs of each side sector are spaced on each side of the sector center radius so these tabs are closer together than each front and rear tab is spaced from the side tab closest to it.

The tabs 92 are formed integrally with the material of the suspension, being an extension thereof. It will be appreciated, however, that the tabs can be separately attached to the suspension by stitching, riveting, or by other means and can be of the same or different material from the main body of the suspension. It also will be apparent that the number of tabs corresponds to the number of tongue members 70, which are preferably six each as shown.

In assembling the suspension 26 to the support and positioning member 24 the former is arranged above the latter, fabric side uppermost and with the gripping tabs adjacent the respective tongue members. A respective front and rear gripping tab 92 then is inserted through a lower one of the respective pairs of slots 80 from the inside to the outside of the tongue member 70. The direction of the tab then is reversed and the tab further laced back through the upper one of the respective pairs of slots 80 in a direction from the outside to the inside surface of the tongue member and then extended up adjacent the inner surface of the tongue member so the tab lies reversely upon itself in the assembly. (See esp. FIGS. 1, 4, 6 and 7.)

Figure 7:
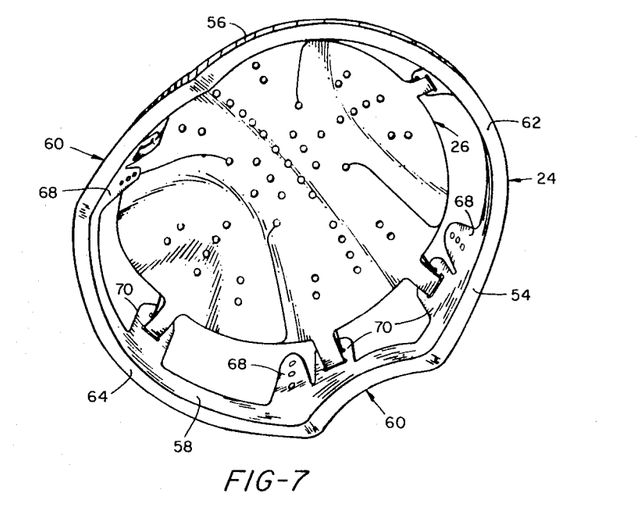
FIG. 7 is a bottom perspective view of an assembly of a support and positioning member and a head suspension attached thereto, removed from the helmet, and with the head band removed.

This procedure is repeated for the respective left and right side tongue members 70 and gripping tabs 92. It will be appreciated that as a result of this assembly when the tabs are properly laced through the slots the suspension will be contoured up over the crown of the head, at times with some overlapping of the edges of the slits and the suspension can engage the crown of the head conforming thereto over substantially the complete surface of the main body of the suspension. The tabs also can be adjusted in the slots 80 so the suspension engages the head principally in the area from front to rear or alternatively from side to side or with one of the sectors of the suspension out of snug engagement with the head when the assembly is worn in a helmet.

After assembly of the suspension 26 to the support and positioning member 24 or if desired before such assembly, the headband 28 can be assembled to the support and positioning means by engagement of the stud 78 through the elongate apertures 79 in the headband and then through one of the openings 72, 74, or 76, provided in the ear members. This positions the headband next to and inside the area bounded by inner wall 58 and its ear members 68 and tongue members 70. Thus in the complete helmet supporting assembly 20 which includes the support and positioning member 24, the head suspension 26 and headband 28, the stated arrangement provides for the tabs 92 and/or edges of the body of the suspension adjacent thereto to be held up by headband and tongue members, gripped between them. This provides for the suspension, although it is somewhat flaccid to be maintained curved upwardly above the head and neatly covering inner liner 46 in position for donning on the head.

It will be observed that the inner wall 58 is slightly higher than outer wall 56 with small notches 94 in it provided between the uppermost portion of the inner walls that extend up between the spaced apart ear members and tongue members to produce webs 96 between these members. This construction provides for the webs to be maintained against the inner liner 46 by resilience or adhesive and the ear and tongue members to be deformed inwardly out the the circumferential plane of the inner wall which facilitates adjustment and attachment and removal of the headband and head suspension therefrom without substantially disturbing the position of the inner wall 58 lying against the inner liner when assembled in a helmet.

Figures 3, 4, 5:
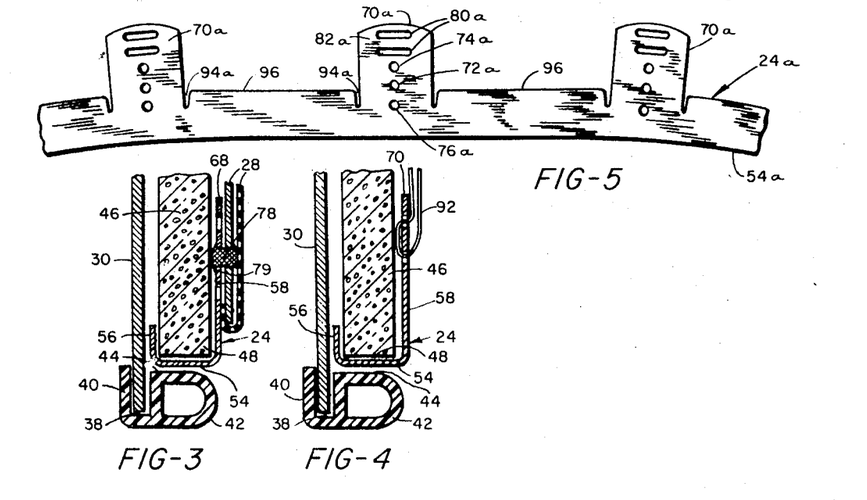
FIG. 3 is a cross-sectional view of a portion of the support and positioning member of FIG. 1 taken along a plane through line 3—3 thereof showing its relation to the helmet shell, lower edging and inner liner when installed in the helmet.
FIG. 4 is a cross-sectional view of a portion of the support and positioning member installed in a helmet as in FIG. 3 but taken along a plane through line 4—4 of FIG. 1.
FIG. 5 is a front half of a modified form of a support and positioning member, opened out, the front and rear halves being substantially identical.
Figure 6:
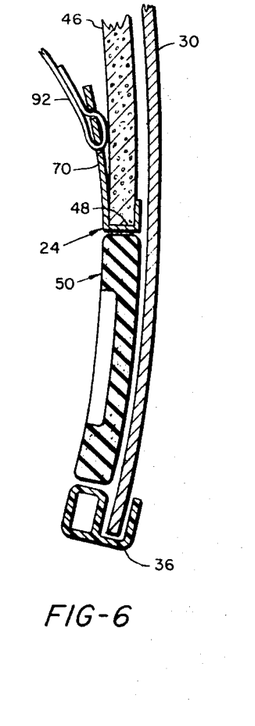
FIG. 6 is a cross-sectional view of a portion of the support and positioning member installed in the helmet of FIG. 1 taken along a plane through line 6—6 thereof.

An alternate embodiment of the support and positioning member 24 is shown in FIG. 5, which can be used in the helmet supporting assembly 20 of FIG. 1 the comparable parts of this alternate support and positioning member 24a being designated on the drawings with the reference character "a" to indicate a related comparability between such parts and those of the first described embodiment. It will be observed that in FIG. 5 the requirements for ear members has been eliminated and in each tongue member 70a there is provided a pair of horizontal adjacent upper and lower slots 80a separated by a gripping bar 82a with the slots positioned in a vertical alignment above a central opening 72a and upper and lower openings 74a, 76a in the same alignment. This provides for gripping in slots 80a of the tabs 92 of the suspension in the manner described above with reference to support and positioning member 24 and these tongues are also capable of respectively supporting one of the studs 78 attached to the headband 28 for positioning support of it. In this embodiment the headband may be provided with the headed studs at six instead of 4 locations as in the embodiment of FIG. 2. Thus whereas the embodiment of FIG. 2 provides a 6 point attachment of the head suspension together with 4 point attachment of the headband, in the embodiment of FIG. 5 the tongue members provide for a 6 point attachment and adjustable support of the headband and a 6 point adjustable attachment of the head suspension. It is understood that the headband, however, can be attached, if desired, only to selected ones of the tongues in this case. Also, the latter embodiment provides for the head suspension to be above the attachment of the headband to the support and positioning member.

In the preferred method of assembling the helmet supporting assembly 20 into a helmet the inner liner 46 which is substantially uniform in thickness, is first fitted up into the upper crown thereof with the outward directed surface of its lower edge 48 left free of attachment to the helmet shell, and the edging 36 and the padding 50, adhered in place. The liner 46 may have the rest of its outer surface, in whole or part, adhered to the shell if desired as by a uniform or discontinuous coating of cement or other adhesive. The helmet supporting assembly as it is resiliently bendable, is then quickly and easily hand fitted into place in the helmet with the bottom wall 54 of the support and positioning member fitted up against the lower edge 48 of inner liner 46 and the outer wall 56 fitted in between the inner surface of helmet outer shell 30 and the outer surface of liner 46 (see FIGS. 1, 3, 4 and 6). The lower edge of the liner is thus neatly fitted into the U-shaped channel of the support and positioning member so the liner is properly held in place thereby. In this position the support and positioning member 24 is itself properly positioned by its abutment on the shelf provided by the upper surface 44 of the edging 36 at the forward part of the helmet and at the sides and rear of the helmet on safety padding 50 and thus also both correctly positions and retains in the helmet the headband 28 and head suspension 26. The support of member 24 is aided, particularly when the inner directed portion of edging 36 is quite narrow, by the sharp, substantially right angle made by bottom and outer walls 54, 56 of this member.

Advantageously the outer wall 56 of the support and positioning member can be rigidly cemented or in some cases otherwise affixed to the inner wall of the shell 30 when properly positioned as aforesaid which attachment, if the liner 46 is not otherwise secured to the helmet shall also maintain the liner supported in correct position. If such adhesive or other affixing is not used the support given to the support and positioning member by the edging 36 and the padding 50 acts to maintain the liner in position aided by resilience of the support and positioning member flexing against inner surfaces of the helmet shell.

It can also be advantageous in some cases to cement the liner lower edge 48 into the channel or U-shaped portion of the support and positioning member 24. It will be appreciated that the attachment of the outer wall 56 to the shell 30 can also be made in other ways than by cementing, e.g. by use of rivets, staples or other fasteners. It will be further appreciated, however, that where the outer wall 56 is frictionally held within the helmet shell or when it is attached thereto by adhesive or similar or non-hard means the possibility is avoided of any "secondary missile" effect from impact in the area of such attaching means that might cause them to be thrown against the head of the wearer, such as rivets and the like, which is an important feature.

Alternatively, the liner 46 can be fitted generally in place in the shell 30 with or without application of cement and the channel of the support and positioning member fitted over the liner's lower edge and either adhered to it or not and the edging and the safety padding then attached in place followed by more exact positioning of the liner and the support and positioning member 24 prior to setting of the cement by thereafter properly engaging the member 24 against the edging and the padding as described above.

It also will be appreciated that with the support and positioning member of this invention, when an impact is received on the shell of the helmet especially when from about, the outer wall 56 of the support and positioning member or means 24, provides with the bottom wall of the member a resilient support hinged at their angle of connection which acts to absorb and distribute energy transmitted thereto from the shell and inner liner. Thus the bottom wall, in addition to distributing impact force onto the cushioning beading 42 of the edging and the safety padding, can deform downwardly under pressure from the liner lower edge and transmit load forces to the headband and head suspension so that both assist to spread the force of impacts. Also, as the gripping tabs are reversed upon themselves between the headband and upstanding positions of the support and positioning member, such impact forces can cause increased tightening together of the adjacent portions of the gripping tabs and of the portion of the tabs in the slots in a manner which absorbs and dissipates a portion of the force. It will be understood that in some cases the head suspension 26 with the tabs, being resiliently somewhat stretchable, absorb force not only by sliding of the tabs through the slots but also in the stretching of the tabs and the main body of the suspension.

It will be appreciated that the support and positioning members of this invention can be unitarily formed with the ear members and/or tongue members assembled thereto by integrally molding them in the inner wall of the support and positioning member or these parts can be formed separately and thereafter permanently assembled, with or without use of separate fasteners, into a unitary support and member. Also, the support and positioning member can be contoured in various ways to adapt it to the contour of the helmet to which it is installed and so as to properly fit against the protective edging bordering the helmet shell or against the safety padding or the like.

Figure 9:
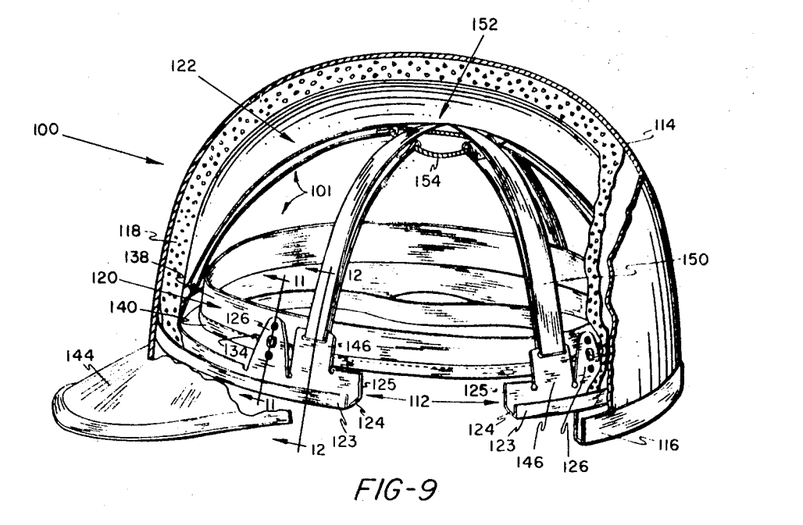
FIG. 9 is a side perspective view of a peak type partial head protective or short type helmet cut away to show the inner components and showing a modified form of support and positioning member installed therein and using another form of sling or head suspension.
Figure 10:
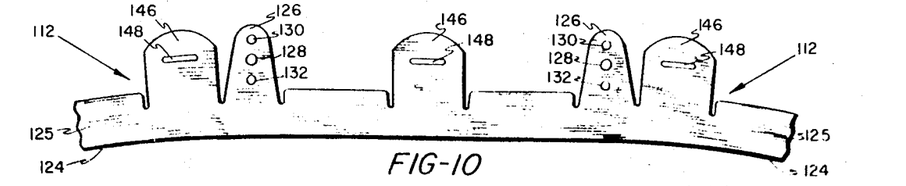
FIG. 10 is a plan view of one-half of the support and positioning member of FIG. 9, opened out, such being either the rear or front half since these halves are substantially the same.
Figures 11, 12:
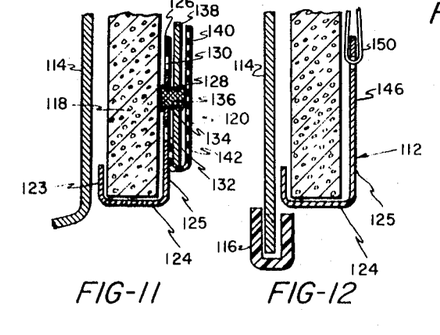
FIG. 11 is a cross-sectional view of the support and positioning member shown in FIG. 9, taken along a plane through line 11—11 thereof, showing the position of the member relative to cross sections along the same plane through the helmet outer shell and inner liner.
FIG. 12 is a cross sectional view through the support and positioning member as in FIG. 11 but taken through a plane through line 12—12 of FIG. 9.

Referring now in detail to FIGS. 9–13, FIG. 9 shows a perspective view of a "beak" or "peak" type protective helmet of the short length type and generally indicated by reference numeral 100, with portions thereof cut-away to show the structural details and relationships of the inner components of the helmet 100 and to show a modified helmet supporting assembly generally designated 101 including a modified support and positioning member 112 of this invention; FIG. 10 shows a plan view of one-half of the support and positioning member 112, such being either the front or rear half since these halves are identical to each other; and FIGS. 11 and 12 show cross-sectional views of the helmet 100 taken along vertical planes that respectively pass through the vertical center of one of the upstanding ear and tongue members of the support and positioning member 112.

The protective helmet 100 includes: a helmet outer shell 114, preferably constructed from a non-resilient, plastic material, such as epoxy, phenolic, or polycarbonate resins either with or without fiber glass reinforcing; a U-shaped protective edging or edging member 116, preferably made from resilient materials, such as vinyl or rubber; an energy-absorbing inner liner 118, preferably constructed from crushable materials, such as beaded, polystyrene foam; the support and positioning member 112, preferably made of flexible plastic, such as polyethylene; a headband or headband mechanism 120, preferably constructed from resilient materials, such as vinyl-coated urethane foam; and a head-suspension or head suspension mechanism 122, preferably constructed from resilient materials, such as nylon webbing or from flexible plastic materials, such as polyethylene. The materials used for these parts can also be used for the comparable parts heretofore described with reference to FIGS. 1 through 8.

In fabricating the helmet of FIG. 9, the inner liner 118, which is shaped to conform to the shape of the outer shell 114, is positioned in abuting relationship with the inner surface of the outer shell 114. The support and positioning member 112 is then positioned so that the lower periphery of the inner liner 118 is seated within the U-shaped lower portion of the support and positioning member 112, with its outer, bottom and inner walls respectively abutting the outer wall 123, floor 124, and inner wall 125 of the support and positioning member 112. The support and positioning member 112 is then rigidly secured to the inner surface of the outer shell 114. This may be accomplished by the use of rivets, nuts and bolts, cotter-pin fasteners, but preferably and most desirably by adhesive applied to the outer surface of the outer wall 123 of the support and positioning member 112.

In addition, spaced droplets or a complete coating of adhesive may be applied between the outer surface of the inner liner 118 and the inner surface of the outer shell 114 to provide increased securement of the inner liner to the outer shell and to prevent the inner liner from being disengaged from the support and positioning member 112. It is to be understood, however, that satisfactory support and positioning of the inner liner 118 within the cavity of the outer shell 114 is achieved by securing only the outer wall 123 of the support and positioning member 112 to the inner surface of the outer shell 114. The application of adhesive as here described can also be used with advantage with the helmet and assembly of FIGS. 1 through 8.

Positioned along and extending from the inner wall 125 of the support and positioning member 112 are several uniformly spaced, ear members 126, such being preferably integral with the inner wall 125. Each ear member 126 has at least one centrally positioned central opening 128, and preferably additional upper and lower openings, 130 and 132.

The ear members 126 are used as means to support and position within the cavity of the helmet 100 the substantially conventional headband mechanism 120. This is accomplished by providing a plurality of spaced elongated-apertures 134 in the headband mechanism 120 which are respectively co-radial with the central openings 128 of the ear members 126. The headband mechanism 120 and ear members 126 are releasably secured together by inserting a double male stud 136 into their co-radially related openings 128 and aperture 134.

It is preferable that there be provided four ear members 126 on the support and positioning member 112, with one at left and right forward ends thereof located slightly in front of the tongue member there, and at the rear an ear member slightly behind each tongue member. By this construction a four point balanced support for the headband mechanism 120 is provided, although less or more point supports may be used without departing from the spirit and scope of this invention.

Vertically adjustable support and positioning of the headband is provided by securing the headband mechanism either to the vertically higher or to the vertically lower openings, 130 and 132, of the support and positioning member 112, each of such openings thereof being co-radial with respect to one of the apertures 134 in the headband mechanism 120. It is to be understood at this point that the ear members 126 may be made larger and additional vertically aligned openings added to provide higher or lower vertical adjustability of the headband mechanism 120 within the cavity of the helmet 100.

In this embodiment of this invention, the headband mechanism 120 is a conventional two-flap headband having an outer plastic strip 138 with the co-radial aperture 134 formed therein, and an inner vinyl-coated foam strip 140 with a plurality of spaced tiny openings 142 formed therein for "wicking" perspiration from the head of the user through the openings 142 and for accelerating evaporation, such construction also used in FIGS. 1 and 3.

A U-shaped resilient or flexible edging member 116 is adhesively secured to the lower periphery of the outer shell 114 to cover the rough edges thereof in a known manner. In this embodiment of the invention, the outer shell includes an integral "beak" member 144, which is not lined with impact absorption material but is edged by the U-shaped member 116, such being conventional and known.

When the novel support and positioning member 112 is used in a helmet configuration that includes a head-suspension mechanism 122, as shown in FIG. 9, several uniformly spaced, upwardly extending, integral tongue members 146 are provided for supporting, positioning, and suspending the head-suspension mechanism 122.

Positioned along and extending from the inner wall 125 of the support and positioning member 112, are the uniformly spaced, tongue members 146, such also being preferably integral with the outer wall 125. Each tongue member 146 has a centrally positioned slot or retaining means 148 which is an opening preferably extending horizontally.

The tongue members 146 are used to support, position, and suspend the substantially conventional head-suspension mechanism 122 within the cavity of the helmet 100. This is accomplished by securing the flexible-webbing members 150 of the head-suspension mechanism 122 to the tongue members 146, e.g., by respectively inserting the webbing members 150 through the horizontal slots 148 of the tongue members 146.

The head-suspension mechanism 122 is conventional and includes a plurality of flexible webbing members 150, one each for each tongue member 146, that are secured together at the crown point 152, with their ends first passing through one of the slots 148 of the tongue members 146 and then extending upward and terminating near the crown point 152. The ends of webbing members 150 are then secured together by a piece of cord 154, for example.

It is preferable that there be provided six tongue members 146 on the support and positioning member 112, with one at the front center, one at the rear center and at the rear or back end, one slightly in front of each ear and at the front one slightly behind each ear. By this construction a six point balanced support and suspension of the head-suspension mechanism 122 is provided, although less or more point supports may be used without departing from the spirit and scope of this invention.

It is to be understood at this point that any of various head suspension mechanisms may be used in combination with the embodiment of the invention of FIGS. 9–13, e.g. a flexible plastic frame with spoke-like members extending from the crown point 152, one each for the tongue members 146. Securement of the head-suspension mechanism to the tongue members 146 may be as shown in FIG. 9, or by the use of adhesive, nuts and bolts, rivets, stitching or other well known fastener devices. It is also contemplated that the head-suspension mechanism may be secured to the tongue members 146 by a plurality of stud members, such as above described regarding the securement of the headband mechanism 120 to the ear members 126 or by snaps or like devices which would hold the folded over webbing 150 to itself above the tongue members. This is particularly envisioned when a flexible, spoke-like, head-suspension frame mechanism is used rather than the flexible webbing type shown in FIG. 9.

Figure 13:
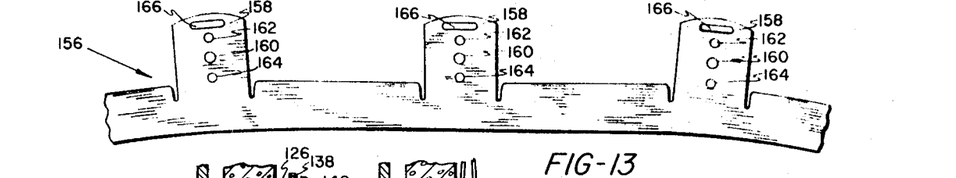
FIG. 13 is a plan view of the front half of a further modified form of support and positioning member, opened out, for use with the head suspension which is shown in FIG. 9.

The embodiment of a support and positioning member generally indicated by reference numeral 156, also includes a U-shaped lower portion that is substantially identical to the lower portion of the support and positioning member 120. The basic difference between this embodiment and the support and positioning member 120 of FIG. 10 is that the upstanding tongue members 158 include both vertically positioned central, upper and lower openings 160, 162, 164, and a horizontally extending slot 166 positioned above the openings. That is to say, this embodiment does not require upstanding ear members. Thus, the tongue members 158 both releasably support and adjustably position the headband mechanism 120 within the cavity of the helmet 100 via the vertical line of openings 160, 162, or 164, and support, position and suspend the head-suspension mechanism 122 within the cavity of the helmet 100 via the horizontal slots 166.

There are preferably at least six tongue members 158 extending from the lower portion of the support and positioning member 156, one at the front center, one at the rear center, one slightly in front of each of the wearer's ears and one slightly behind each of the wearer's ears. By this construction a six point balanced support, positioning and suspension of both the headband mechanism 120 and head-suspension mechanism is provided.

It is contemplated, however, that a four point headband mechanism support can be achieved by merely excluding the use of the openings in the front and rear tongue members 158, and it is also contemplated that more or less tongue members 158 may be used to provide variable point support of the headband mechanism 120 and head-suspension mechanism 122, such modifications being within the spirit and scope of this invention.

Positioning of either the support and positioning members 112 or 156, as indicated in FIGS. 9 and 12, can be by abutting over the top inner directed edge of the edging member 116.

Figure 14:
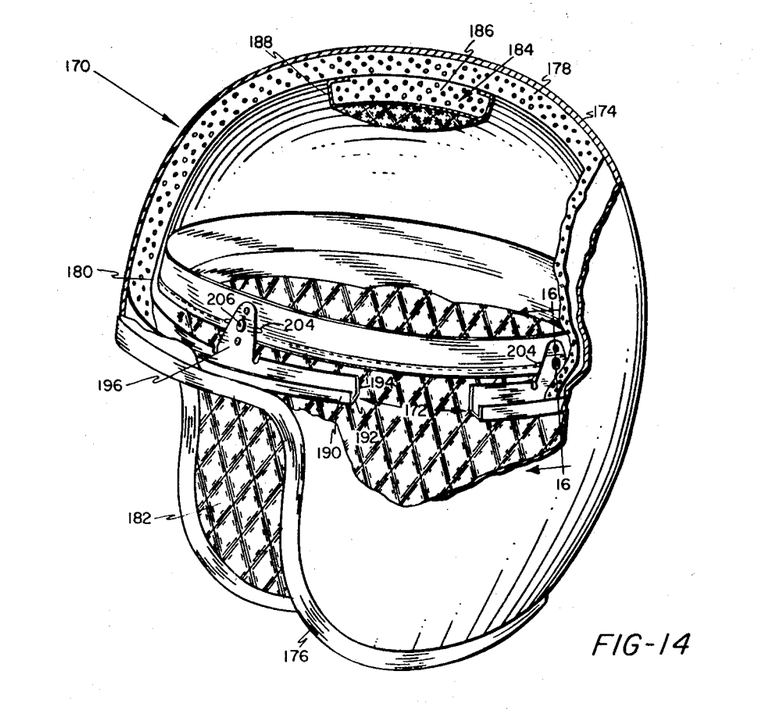
FIG. 14 is a side perspective view of a full head protective or long type helmet partially cut away to show the interior components thereof and showing another modified form of a support and positioning member installed in the helmet with a headband assembled to the member for use without a head suspension or sling.
Figure 15:
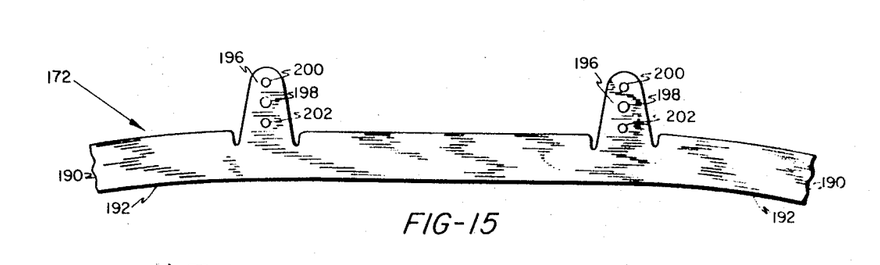
FIG. 15 is a front or a rear plan view of the support and positioning member of FIG. 14, opened out, front and rear halves of the member being substantially identical.
Figure 16:
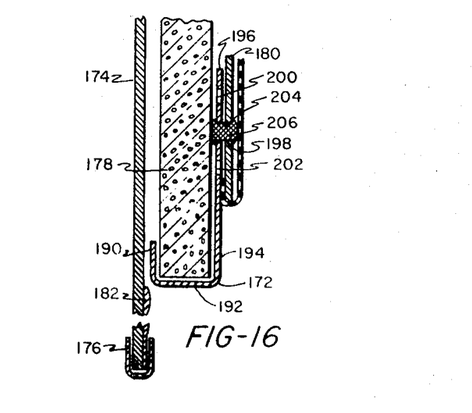
FIG. 16 is a cross-sectional partial view through the helmet of FIG. 14 taken along a plane through line 16—16 thereof, showing the support and positioning member in place in the helmet.

Referring now in detail to FIGS. 14–16 joined hereto, FIG. 14 shows a perspective view of a long or "full-jet" type protective helmet, generally indicated by reference numeral 170, with portions thereof cut-away to show the structural details and relationships of the inner components of the helmet 170 and to show a preferred embodiment of the support and positioning member 172 of this modification of the invention; FIG. 15 shows a plan view of one-half of the support and positioning member 172, such being either the front or rear half since these halves are substantially indentical to each other: and FIG. 16 shows a cross-sectional view of the helmet 170 taken along a vertical plane that passes through the vertical center of one of the upstanding ear members of the support and positioning member 172.

The protective helmet 170 includes: an outer shell 174, preferably constructed from a non-resilient material such as fiber glass reinforced plastic; a U-shaped edging member 176, preferably made from resilient materials such as vinyl or rubber; an energy-absorbing inner liner 178 secured to the upper portion of the shell 174, preferably constructed from crushable materials such as beaded, polystyrene foam; the support and positioning member 172 and preferably made of flexible plastic such as polyethylene; a headband mechanism 180, preferably constructed from resilient materials such as vinyl-coated urethane foam: a comfort liner 182 secured to the lower inner portion of the outer shell 174 and preferably constructed from a soft fabric such as nylon, silk, cotton, etc.; and an energy-absorbing crown pad 184 having an inner energy-absorbing wafer-shaped member 186, preferably constructed from crushable material such as beaded, polystyrene foam, and a flexible outer covering 188, preferably constructed from a soft fabric such as nylon, silk, cotton, etc. The comfort liner 182 and outer covering 188 of the crown pad are preferably quilted to enhance their "softness" characteristics, and a soft nonwoven fabric may be inserted between the comfort liner 182 and the outer shell 174 to further enhance the "softness" characteristics of the lower-inner portion of this "full-jet" protective helmet.

In fabricating the helmet of FIG. 14, the inner liner 178, which is shaped to conform to the shape of the upper half of the outer shell 174, is positioned in abutting relationship with the inner surface thereof. The support and positioning member 172 is then positioned so that the lower periphery of the inner liner 178 is seated within the U-shaped lower portion of the support and positioning member 172, with its outer, bottom and inner walls respectively abutting the outer wall 190, floor 192, and inner wall 194, of the support and positioning member 172. The support and positioning member is rigidly secured to the inner surface of the outer shell 174, for example, by the use of rivets, nuts or bolts, cotter-pin fasteners, or preferably by adhesive applied to the outer surface of the outer wall 190 of the support and positioning member 172 as in the previously described embodiments.

Spaced droplets or a complete coating of adhesive may be applied between the outer surface of the inner liner 178 and the inner surface of the outer shell 174 to provide increased securement of the inner liner to the outer shell and to prevent undesirable relative movement between these two helmet components. Droplets or a coating of adhesive may also be applied between the lower end of the inner liner 178 and the inner surface of the U-shaped portion of the support and positioning member 172 to prevent the inner liner from being disengaged therefrom. Satisfactory support and positioning of the inner liner 178 within the cavity of the outer shell 174 is achieved, however, when adhesive is applied only to the outer wall 190 of the support and positioning member 172 as in the previously described embodiments.

Positioned along and extending from the inner wall 194 of the support and positioning member 172 are several uniformly spaced, ear members 196, such being preferably integral with the inner wall 194. Each ear member 196 has at least one centrally positioned central opening 198 and preferably additional upper and lower openings 200 and 202.

The ear members 196 are used to support and position within the cavity of the helmet 170 the substantially conventional headband mechanism 180. As stated above with regard to the helmet of FIG. 9, a plurality of apertures 204 are provided in the headband mechanism 180 which are respectively co-radial with the central openings 198 of the ear members 196. The headband mechanism 180 and ear members 196 are releasably secured together by inserting a double male stud 206 into the co-radially related openings 198 and 204.

It is again preferable that the headband mechanism 180 be suspended by a four point suspension. Therefore, it is preferable that four ear members 196 be provided on the support and positioning member 172 of this embodiment of the invention. Satisfactory results have been achieved by positioning at each side of the head one ear member 196 slightly in front of each of the wearer's ears and one ear member 196 slightly behind each of the wearer's ears. It is to be understood, of course, that more or less ear members may be used without departing from the spirit and scope of this invention.

Vertical adjustability of the headband mechanism 180 is provided by securing it to either the vertically higher or to the vertically lower openings 200 or 202, each of such openings also being co-radial with respect to one of the apertures 204 in the headband mechanism 180. The construction of the headband mechanism 180 is substantially identical to that of the headband mechanism 120 above described with regard to the protective helmet of FIG. 9, as also is the construction and securement of the edging member 176 of this embodiment regarding the edging member 116 of the embodiment of FIG. 9.

In the embodiment of the invention of FIG. 14 the support and positioning means excludes means for supporting positioning and suspending a head-suspension mechanism. It is to be understood, however, that in this type of protective helmet, to wit, one not using a head-suspension mechanism, any of the above described support and positioning members may be substituted for the support and positioning member 172. In that event, of course, the horizontally extending slots in the tongue members would not be used in the "full-jet" helmet of this embodiment. The crown pad 184 provides a cushioning over the top of the head available to absorb forces of impact.

The support and positioning member 172 of the latter embodiment of the invention may be slightly cheaper to manufacture since it does not include tongue members, such as are provided in the above described support and positioning members 112, nor does it include a horizontally extending slot positioned above the vertically positioned openings on the ear members, such as provided in the above described support and positioning member 156.

It will be understood that the assemblies of this invention can be used in various types of headgear including helmets for motor-cyclists, police and riot helmets, and in other protective or ornamental headgear such as hats and the like. In addition the energy-absorbing inner liner can be constructed of various, preferably stiff and crushable materials, which are preferably semi-resilient but, in some cases, resilient materials including plastic foams, cork, rubber, felt or like materials and the headband can be constructed, as shown, to have a stiffly resilient, thin outer support layer or ring assisting to absorb impact forces and have the inner foam pad as shown or be provided with one or more layers of leather or the like soft materials for lining of the support ring.

While several preferred embodiments of this invention have been described and illustrated, it is to be understood that other embodiments as may be suggested to those having the benefit of the teachings herein.

What is claimed is:
1. A support and positioning device for securing and supporting over the head of a wearer an energy-absorbing member and a headband mechanism in desired positions within the cavity of a protective helmet, said device comprising:
 (a) head encircling means for supporting an energy-absorbing member in a desired position within the cavity of a protective helmet;
 (b) means on said head encircling means for securing said energy-absorbing member to the helmet shell in said desired position within the said cavity;
 (c) means on said head encircling means for supporting said headband mechanism in a desired position within the said cavity; and
 (d) attachment means for securing said headband mechanism to said head encircling means in a desired position within the said cavity.

2. The support and positioning device according to claim 1 which further includes means for suspending a head-suspension mechanism in a desired position within the cavity of said helmet.

3. The support and positioning device according to claim 1 in which:
   (a) said head encircling means for supporting said energy-absorbing member in a desired position is a U-shaped channel member projecting from said device and contoured to peripherally fit the head of the wearer, and in which
   (b) the lower peripheral edge of said energy-absorbing member is positioned within said channel member and supported thereby, and
   (c) the outer wall of the channel member forms said means on said head encircling means for securing said energy-absorbing member to the helmet shell in said desired position.

4. The support and positioning device according to claim 1 in which said means on said head encircling means for supporting said headband mechanism in a desired position is a plurality of spaced ear members extending from said head encircling means and said attachment means is a plurality of spaced fastener members which extend through and secure together said headband mechanism and said head encircling means.

5. The support and positioning device according to claim 1 in which:
   (a) each of said ear members has at least two openings formed therein; and in which
   (b) said openings in each of said ear members are co-radial with a corresponding opening in said headband mechanism; and in which
   (c) said attachment means is a plurality of stud members which respectively extend through said openings in said headband mechanism and one of said openings in its respective ear member; and in which
   (d) said headband mechanism is adjustably positionable within the cavity of said protective helmet by selectively extending each stud member through the other of said openings in its respective ear member.

6. The support and positioning device according to claim 2 in which said means for suspending said head-suspension mechanism in a desired position is a plurality of spaced slotted tongue members extending from said head encircling means, said tongue members further defining a plurality of hole means adapted to receive fastener means for supporting said headband mechanism in the desired position.

7. The support and positioning device according to claim 2 in which:
   (a) said means for supporting said headband mechanism in a desired position is a plurality of spaced ear members extending from said head encircling means; and in which
   (b) said means for suspending said head-suspension mechanism in a desired position is a plurality of spaced tongue members extending from said head encircling means.

8. The support and positioning device according to claim 7 having a head-suspension mechanism engageable over the head of its wearer and in which said means for suspending said head-suspension mechanism in a desired position is a plurality of spaced fastener members which extend through and secure together said head-suspension mechanism and said device.

9. The support and positioning device according to claim 8 in which said head-suspension mechanism is secured to said tongue members by a plurality of spaced fastener members which respectively extend through and engage slot retaining means in said tongue members.

10. The support and positioning device according to claim 7 in which:
    (a) there is a headband mechanism engageable around the head of a wearer; and
    (b) a head suspension mechanism engageable over the head of the wearer;
    (c) each of said ear members having at least one opening formed therein for receiving a fastener member for attachment thereto of said headband mechanism;
    (d) each of said tongue members having at least one slot formed therein;
    (e) said head-suspension mechanism being provided with a plurality of flexible members which form a web-like structure; and
    (f) each of said flexible members being extended through at least one of said slots in said tongue members so as to releasably and slidably secure said web-like structure to said tongue members.

11. The support and positioning device according to claim 2 in which:
    (a) said means for supporting said head-suspension mechanism in a desired position is a plurality of spaced tongue members extending from said device; and in which
    (b) each of said tongue members has at least one opening formed therein; and in which
    (c) said head-suspension mechanism has a plurality of flexible members which form a web-like structure; and in which
    (d) said flexible members respectively extend through said one opening in said tongue members so as to be releasably and slidably secured to said tongue members.

12. The support and positioning device according to claim 9 in which each of said ear members is positioned adjacent to a tongue member and said spaced fastener members are individually adjustable to position the helmet on the head of the wearer.

13. The support and positioning device of claim 7 in which said head encircling means is a U-shaped channel and said tongue and ear members extend upwardly and inwardly from the inner wall of said U-shaped channel.

14. The support and positioning device of claim 7 in which said head-suspension mechanism is a thin flexible panel adapted to fit the top of the head of the wearer and said fastener members are extended from said panel for adjustably securing the thin flexible panel to said supporting and positioning device.

15. The support and positioning device of claim 14 in which said thin flexible panel is slit to form a plurality of sectors that fit the top of the head with at least one fastener member extending from each sector for securing the flexible panel to said support and positioning device.

16. A support and positioning device for securing and supporting an energy-absorbing member and a headband mechanism in desired positions within the cavity of a protective helmet, said device comprising:
    (a) means for supporting said energy-absorbing member in a desired position within the cavity of said protective helmet;
    (b) means for securing said energy-absorbing member to the helmet shell in said desired position within the cavity of said helmet;
    (c) means for supporting said headband mechanism in a desired position within the cavity of said helmet;
    (d) means for securing said headband mechanism in a desired position within the cavity of said helmet;
    (e) means for suspending a head-suspension mechanism in a desired position within the cavity of said protective helmet;
    (f) said means for suspending said head-suspension mechanism in a desired position including a plurality of spaced tongue members extending from said device,
    (g) with each of said tongue members having at least one opening formed therein;

(h) said head-suspension mechanism having a plurality of flexible members which form a web-like structure; and (i) said flexible members respectively extended through said one opening in said tongue members so as to be releasably and slidably secured to said tongue members.

17. A protective helmet assembly having a support and positioning device securing and supporting an energy-absorbing member and a headband mechanism in desired positions within the cavity of said protective helmet, said assembly comprising:

(a) a protecive helmet having an energy-absorbing member positioned within the said cavity for absorbing impact energy received against the shell of said helmet;

(b) head encircling means supporting said energy-absorbing member in a desired position within the cavity of said protective helmet;

(c) means on said head encircling means securing said energy-absorbing member to the helmet shell in said desired position within the cavity of said helmet;

(d) a headband mechanism;

(e) means on said head encircling means supporting said headband mechanism in a desired position within the cavity of said helmet; and (f) means securing said headband mechanism in a desired position within the cavity of said helmet.

18. The protective helmet assembly according to claim 17 further including means for suspending a head-suspension mechanism in a desired position within the cavity of said protective helmet.

19. The protective helmet assembly according to claim 17 in which:

(a) said means for supporting said energy-absorbing member in a desired position is a U-shaped channel member projecting from said device, and in which (b) the lower peripheral edge of said energy-absorbing member is positioned within said channel member and supported thereby; and (c) the outer wall of the channel member forms said means on said head encircling means for securing said energy-absorbing member to the helmet shell in said desired position.

20. The protective helmet assembly according to claim 19 in which said outer wall is adhesively secured to the lower edge area of said helmet shell.

References Cited
UNITED STATES PATENTS

| | | | |
|---|---|---|---|
| 3,015,103 | 1/1962 | Zbikowski | 2—3 |
| 3,122,751 | 3/1964 | Jordan | 2—3 |
| 3,268,911 | 8/1966 | Cox | 2—3 |
| 3,387,304 | 6/1968 | Simpson et al. | 2—3 |
| 3,422,459 | 1/1969 | Bowers, Jr. | 2—3 |
| 3,430,260 | 3/1969 | Johnson et al. | 2—3 |

JAMES R. BOLER, Primary Examiner